March 18, 1969
C. W. PFLIEGER
3,433,029
CONTROL FOR HEAT TRANSFER SYSTEM
Filed Jan. 14, 1966
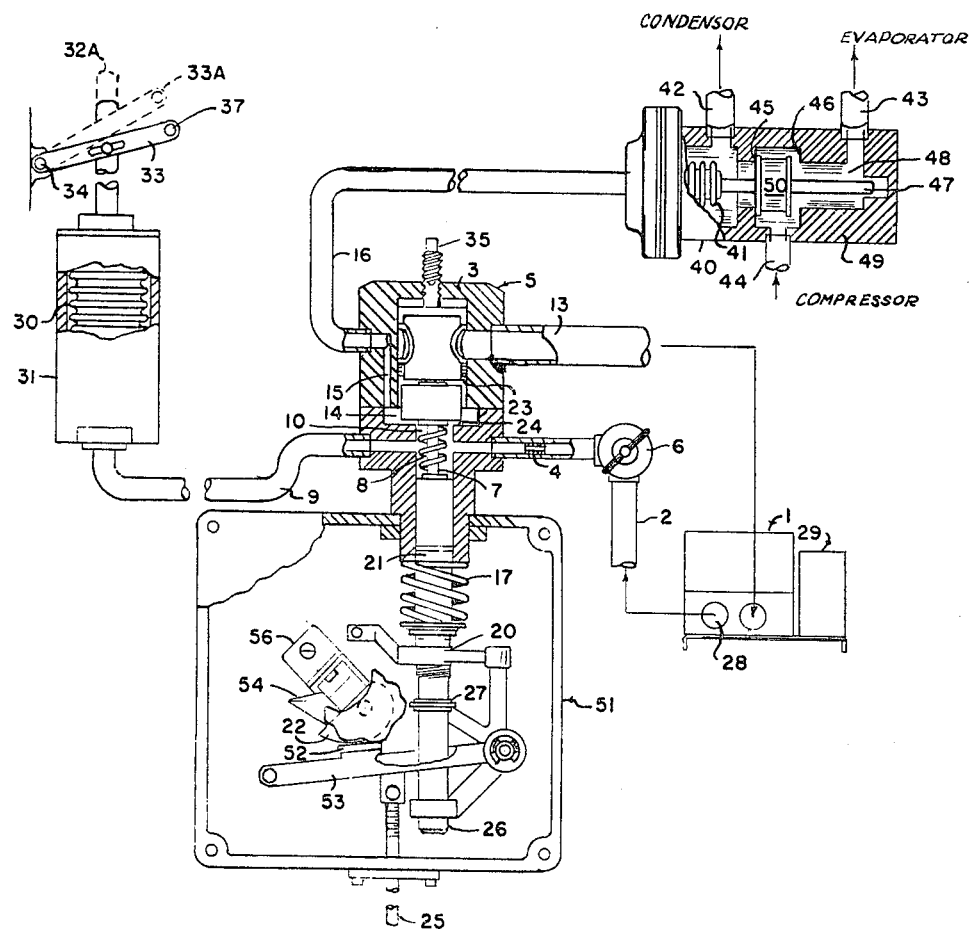
INVENTOR
CHARLES W PFLIEGER
BY
John P. Murphy
ATTORNEY United States Patent Office 3,433,029
Patented Mar. 18, 1969

3,433,029
CONTROL FOR HEAT TRANSFER SYSTEM
Charles W. Pflieger, 232 Oxford Road,
New Hartford, N.Y. 13413
Continuation-in-part of applications Ser. No. 207,301,
July 3, 1962, and Ser. No. 354,646, Mar. 25, 1964.
This application Jan. 14, 1966, Ser. No. 521,248
U.S. Cl. 62—160                                  8 Claims
Int. Cl. F25b 13/00, 29/00; B60h 3/00

ABSTRACT OF THE DISCLOSURE

The disclosure relates to a temperature control system for heating and cooling in which a diesel driven heat pump is controlled by a single compartment temperature sensor. A fluid relay using the lube oil system of the diesel is actuated in response to the compartment temperature and the relay controls the movement of a switching valve of the heat pump and a diesel speed throttle to thereby control the compartment temperature by providing heating or cooling.

---

This invention relates to heat transfer systems, and more particularly to a control for a refrigeration system.

This application is a continuation-in-part of application Ser. No. 207,301, filed July 3, 1962, by Charles W. Pflieger, for Control for Heat Transfer System, and also of application Ser. No. 354,646, filed Mar. 25, 1964, for Control for Heat Transfer System, both now abandoned.

Mobile refrigeration systems find widespread use in the form of compact units carried by trucks and railroad cars and the like for the protection of perishable goods in transit. These systems basically comprise a conventional evaporator and compressor unit driven by a small diesel motor. The control device for the heating and/or cooling functions of the system relies on electricity supplied by the main vehicle system or by a battery carried by the heat transfer system itself. In either case, the control must necessarily contain switches, relays, solenoid valves, as well as a generator and regulator. The control of the conventional system, therefore, is fully dependent on the proper adjustment and operation of devices which are subject to malfunction or complete failure.

Perhaps the main objection to conventional refrigeration systems is the fact that these systems controls usually fail to maintain the refrigerated compartment at the set temperature. That is, such systems generally switch abruptly to the cooling function as the temperature passes above the set point, then again switching abruptly to heating as the temperature falls below the set point. Insofar as these prior art devices operate on an "on" and "off" or "make-break" basis, a continuously variable control between heating and cooling is unobtainable.

This inability of prior art devices to maintain a preset temperature without abruptly employing full cooling measures is particularly objectionable when controlled atmospheres and refrigeration are employed to preserve perishable goods. This method is used when it is desirable to preserve goods at slightly above freezing temperature and requires an atmosphere of limited oxygen content to suppress the growth of bacteria and a constant moisture content to prevent desiccation of goods. Prior art control systems, when the set temperature to be maintained is slightly above freezing, usually cause the evaporator to operate so that a surface in contact with the atmosphere is below the freezing point of water. Thus, water vapor condensation occurs, and the humidity is lowered in the container. There is no practical method known for replacing the moisture content in the atmosphere; for if a humidifier is placed in the system, the surface of the evaporator which is below freezing point will simply remove more moisture from the air, interfering with defrosting the evaporator.

It is therefore a main object of this invention to provide a continuously variable control for a heat transfer system.

Another main object is to provide a control for a heat transfer system which will maintain the temperature at the set point.

Another main object of this invention is to provide a control for a heat transfer system used in conjunction with controlled atmosphere. This control allows the use of conventional evaporator and compressor systems to maintain temperatures slightly above freezing without reducing the moisture content of the refrigerated compartment.

Another important object of this invention lies in the provision of a control which is self-regulating and controls the primary power means for the heat transfer system, while deriving its moving power from the power means.

Another object is to provide a control means which is subject to failure only in response to complete failure of the heat transfer system.

Another object is to eliminate the use of electrical devices in a mobile control system and to provide for a control in which all parts are totally enclosed against foreign matter.

In carrying out the objects of this invention, there is provided a control for a mobile heat transfer system having a power means and a heat transfer means comprising a variable control valve having a power governor actuating valve and a function control valve, a governor for the primary power means, a function switching valve for the heat transfer means, a source of power for the control valve and thermal responsive means operable to actuate the control valve. The invention also includes adjustment means for establishing a desired set point at which the control will maintain the temperature of a controlled compartment.

Other advantages and objects of the invention will become apparent from the following detailed specification, when read with reference to the accompanying drawing, in which:

FIG. 1 is a diagrammatic view, with some parts shown in section, and showing the control in conjunction with a heat transfer system for maintaining the temperature within a compartment.

It will be assumed that there is a compartment which is to be maintained at a preset temperature, or it will be assumed that there is a compartment which is to be maintained at a temperature slightly above freezing and at a constant humidity level. For instance, a mobile trailer for the shipment of perishable goods would represent such a compartment, as would a refrigerated railway freight car. Such compartments are generally insulated against the environmental temperature effects, and are provided with a system adapted to refrigerate same. Such systems normally use a refrigerating medium that operates in either of two phases such as to extract heat from one area and transfer the heat to another area; and employ condenser and evaporating coils to this end. Such a system has not been illustrated in detail here. However, the main elements are symbolically represented as at 1, which is a conventional internal combustion engine supplying primary power to the system; and at 29, which is a conventional heat transfer means. The heat transfer means 29 is adapted conventionally to cool a compartment (not shown) by extracting heat therefrom, or heat the compartment above the ambient environmental temperature by transferring the heat to the compartment.

This invention specifically concerns a continuously variable control for the refrigeration system. The control includes the combination of a variable control valve which throttles the primary power means, a governor operated by the primary valve for operating the throttle, a switching valve for controlling the heat transfer of the refrigerating means, and a thermostatic device for operating the variable control valve in response to temperature changes in the controlled compartment.

The variable control valve 5 comprises a housing forming a substantially cylindrical axial chamber. The housing may be formed in sections to facilitate the forming of the chamber. This axial chamber is further defined as being a governor control chamber 10, a switching valve chamber 14 and a bleed chamber 12. Valve seats are formed between the various chambers, and form means for permitting a valve to seal one chamber from another. Valve seat 24 may be formed as a shoulder or the like between chambers 10 and 14.

Valve seat 23 is formed on the lower end of an adjustable insert 35 which is disposed with a threaded member extending through the housing of the valve 5. The threaded member may be turned to move the valve seat 23 vertically, as will appear. A duct 15 is formed from chamber 14 to a conduit 16, as will appear.

Disposed in the control valve 5 is a valve element and valve lifter mechanism. The valve element 11 is placed between chambers 12 and 14, and one end of the element 11 is adapted to seat against the valve seat 24. The element is adapted to be moved axially away from valve seat 24 and into engagement with seat 23. The valve lifter mechanism comprises valve rod 7 held captive within a cylindrical valve rod 21. A compression spring 8 is disposed around valve rod 7 so as to normally urge the valve element 11 and rod 7 on which the element is carried away from the rod 21. A second compression spring 17 is disposed around the lower end of rod 21 against a captive washer so as to normally urge the rod 21 downwardly out of the chamber 10. It will be understood that the rod 7 being captive within the rod 21, the compression of the springs 8 and 17, as well as the lengths of the rods with respect to the headspace of the valve seats is predetermined in accordance with whatever fluid pressures will be present within the control valve 5 and the actuating force against the bottom or outer end of the rod 21. It will also be apparent that the adjustable inert 35 is likewise adjusted to provide proper headspace between valve element 11 and valve seat 23 with respect to the required fluid displacement for proper operation of the valve.

The variable control valve 5 is adapted to be operated in response to thermostatic action, and thence to permit the displacement of fluid under pressure to the governor and/or the switching valve. Hence, 28 represents a pump or pressure outlet for fluid from the primary power means 1. Since the power means 1 is conventionally a diesel engine or the like, it is convenient to use the lube oil from the sump of said engine, and further to supply said oil at pressure proportional to the speed of the engine.

Conduit 2 is provided as a connection between the pump 28 and the valve 5. A pressure regulator 6 of conventional design is inserted in the conduit 2 to prevent high pressure oil from being delivered to the valve 5 beyond that which is required to achieve control of the system. An orifice 4 of predetermined size is also inserted in the conduit between the regulator 6 and the valve 5. Fluid pressure in the form of engine sump oil is thus caused to enter the chamber 10 of the variable control valve 5.

The first outlet from chamber 10 is a conduit 9, which is connected to governor 31. The governor 31 may be any conventional type as may, for instance, contain a bellows 30. The bellows 30 in this embodiment is expansible when fluid pressure is introduced therein from conduit 9, thence operating to move stem 32 outwardly, and also to retract the stem 32 when the pressure is reduced.

Any lever 33 or the like may be operatively connected to stem 32 and pivotally supported as at 34. The other end may be connected to the throttle of the primary power means 1 as at 37 or the like. Thus, movement of the lever 33 toward the position 33A will increase the speed and output of the primary power means 1.

The outlet from chamber 12 is a bleed line 13 for the purpose of returning oil to the sump of the primary power means 1.

The switching valve 40 is essentially a transfer valve for controlling the function of the heat transfer means 29 and its effect on the compartment (not shown) being controlled. A housing 49 defines a chamber 48 having a condenser outlet port 42 at one end thereof, and an evaporator outlet port 43 at the other end. At some point intermediate the outlet ports 42 and 43 is a compressor inlet port 44 to the chamber 48. Also formed in the chamber 48 is a valve seat 45 between inlet port 44 and port 42; and a second valve seat 46 between port 44 and outlet port 43.

A valve element 50 is operatively carried on a valve stem 47 to operate between valve seats 45 and 46. The valve stem 47 is attached to, for instance, an expansible bellows 41 which, in turn, is connected to the conduit 16 hereinabove described as being connected to outlet port 15 of the variable control valve 5.

When fluid pressure in conduit 16 and bellows 41 is at or below a predetermined pressure, the bellows is adapted to be in a state of contraction (as illustrated) such that the stem 47 moves valve element 50 against valve seat 45, thus transferring gas from the compressor to outlet port 43 and thence to the evaporator of the heat transfer device 29. When fluid pressure in the bellows 41 is caused to exceed the predetermined pressure, the valve element 50 is moved to a position either intermediate the valve seats 45 and 46 to permit a mixture of the compressor gas in the condenser and evaporator; or against valve seat 46 to transfer the entire output of the compressor to the condenser via port 42.

In order to control the operation of the variable control valve 5, thermostatic means is provided in the form of an adjustable thermostat 51. Any convenient structural enclosure is mounted on the compartment (not shown) being controlled. The variable control valve 5 may be mounted on the enclosure with the rod 21 extending into the housing. The adjustable thermostat 51 comprises means responsive to changes in temperature and linkage associated with same for operating against the rod 21 to control the operation of the control valve.

The temperature responsive sensor element is shown diagrammatically as at 25. It may be a threshold device which operates when certain predetermined upper and lower limits are reached, or it may be a proportioning type which reacts in proportion to infinite variations in the temperature of the controlled compartment. Primarily, it must produce a straight line movement under influence of a temperature change, and may be selected from the several conventional types available. The amount of movement of sensor element 25 must be converted into movement in the amount required for optimum control of valve 5. To this end there is provided linkage including a push rod 26 having one end disposed against the end of rod 21. Said end is disposed slidably through a collar 20, part of structure which is formed from the thermostat housing. A compression spring 27 is carried by rod 26 between the collar 20 and a suitable washer held captive on the rod 26. A link 53 is pivotally mounted at one end to the thermostat housing. The other end of the link 53 is pivotally connected to any intermediate link 55 which actuates the movement of the rod 26, by being engaged in a slot or the like in the rod.

The adjustment means for the thermostat 51 may be any cam 22 which bears against a seat 52 on link 53, and which may be adjusted by a knob and pointer 54 to preset the control temperature of the system. Any additional means such as a shaft mounting 36 may be provided for locking cam 22 in its preset position by gripping its shaft frictionally, such that vibrations, etc., of the mobile compartment will not jar it.

For convenience in describing the operation of the control for a refrigeration system as described hereinabove; we shall assign certain hypothetical values to the primary power means, etc., based on a given set of predetermined adjustments of the entire system. Therefore, we shall assume the primary power means 1 to be an engine which idles at 850 r.p.m. with an oil pump 28 output of 6½ p.s.i. to the governor control chamber 10. Any speed above idle will be considered as high speed, with oil pressure to the chamber 10 as being up to 15 p.s.i. We shall arbitrarily set the thermostat adjustment 54 at 38°, this being the set point. This action moves link 55 to preset the position of link 53 and rod 26 for control of the system.

To begin with, it is assumed that the engine 1 is in high speed heat, producing up to 15 p.s.i. oil pressure to the governor chamber 10, thence through conduit 9 to the bellows 30 of the governor 31; whereby rod 32 moves lever 33 to 33A to maintain the high speed. Any oil pressure in bellows 41, conduit 16 and chambers 14 and 12 has bled through conduit 13 to the sump; and valve elements 11 and 50 are in the illustrated position.

Sensor element 25 is retracted downwardly, along with the associated linkage. This allows spring 27 to expand and resultantly retract rod 26; whereby rod 21 is downwardly disposed to permit seating of valve element 11 on seat 24.

Now as the temperature in the controlled compartment (not shown), increases because of the hot compressor gases being directed into the evaporator, sensor element 25 begins to expand upwardly, moving the link 55 upwardly. The compression of the spring 27 is thereby increased and rod 26 begins to act against rod 21 and the resistance of spring 17. As the temperature in the compartment approaches the set point rod 21 begins to lift, overcoming the force of spring 17. It should be remembered that, with valve element 11 on seat 24, full oil pressure stands in the governor 31 to maintain high speed. The temperature of the compartment now reaches and/or passes the set point. Rods 7 and 21 and spring 8 move as a unit to a point whereby valve element 11 is between seat 24 and seat 23 in chamber 14 and oil bleeds from the governor 31 through conduit 9 into chamber 14 and chamber 12, returning to the sump of engine 1 via conduit 13. Oil pressure in governor 31 decreases to 6½ p.s.i. and engine 1 slows to idle.

Should the temperature of the compartment rise above the set point, valve element 11 will be raised, as described hereinabove, against seat 23. Further expansion of sensor element 25 is taken up by the further movement of the cylindrical rod 21 along rod 7 against the urging of spring 8.

With valve element 11 against seat 23, no oil is further permitted to bleed through bleed line conduit 13, and oil pressure commences to build up in outlet port 15, conduit 16 and bellows 41 of switching valve 40. This oil pressure increases simultaneously through conduit 9 to bellows 30 of governor 31; whereby stem 32 begins to move lever 33 toward position 33A, increasing the speed of the engine 1. This increases the proportional oil pressure and the system almost immediately operates in high speed cooling phase.

This is accomplished by increased pressure in bellows 41 moving rod 47 and carrying valve element 50 away from valve seat 45 and onto seat 46; thus transferring the output of the compressor into the condensor.

Now, as the compartment is cooled so that the temperature again approaches the set point, sensor element 25 contracts, moving the linkage in the thermostat 51 downwardly and decreasing the pressure of spring 27. Rod 26 retracts and permits rods 21 and 7 to begin to move as a unit and lower the valve element 11 away from seat 23 slightly. This placement of element 11 midway in chamber 14 again permits bleeding of oil pressure from the governor as before, and the pressure reduces toward 6½ p.s.i.

At 6½ p.s.i. the engine 1 slows to idle speed. Although the pump 28 still puts out oil under pressure at 6½ p.s.i. the attitude of valve element 11 is such that, coupled with the oil flow through orifice 4, sufficient oil bleeds from bellows 41 and conduit 16 as to permit the pressure in bellows 41 to fall to approximately 5 p.s.i. whereby rod 47 and valve element 50 switch from seat 46 to seat 45. This condition effects a transfer to the evaporator, or may effect a mixture of compressor gas to the condenser and the evaporator to achieve a balance of temperature control.

It will be obvious that cooling of the compartment below the set point will result in the disposition of the various elements of the control to the position first described hereinabove.

Those skilled in the art will also be aware that the above discussion exemplifies the operation of the control for extreme conditions whereby the temperature of the compartment is either well below or well above the set point respectively. In actual operation the control "settles down" after a few heating and cooling cycles to a condition involving only slight transferring of compressor output between the condenser and the evaporator; and usually passes a mixture of gas to each. Thus the temperature of the compartment tends to hover about the set point, and the engine is under continuously variable control, rather than being caused to operate first at high speed, then at idle, then back to high speed.

The sensitivity of the control valve 5 is largely dependent on proper adjustment of the insert 35 to provide just the required headspace to achieve proper oil displacement when valve element 11 moves between the valve seat 23 and the valve seat 24. One other important initial adjustment concerns the lengths of the sensor element 25 with respect to its movement against the link 53. These two initial adjustments, if made properly, insure substantially immediate response of the control to variations of temperature in the compartment.

It is therefore obvious that this apparatus comprises means providing continuously variable control of a heat transfer system for maintaining the temperature of a compartment at the set point. At the same time, objects of the invention are accomplished in that the device does not restrict its function to the heat transfer system, but also controls the primary power means for the system; thereby affording complete control and rendering the entire system self-regulating. This device thus controls the primary power means from which it derives its motivating power and assumes substantially immediate responsive control even under the influence of rapid changes in environmental conditions. Also, this immediate and continuous response insures that if it is desirable to maintain a set temperature of slightly above freezing in a sufficiently insulated compartment, the evaporator will not be operated in such a way to reduce the moisture content in the compartment.

A preferred embodiment of the invention having been shown and described, it is to be understood that changes may be made which fall within the scope of the appended claims.

I claim:

1. A continuously variable control for a heat transfer system having a heat transfer means controlling the temperature in a compartment and an engine supplying power to said means; said control comprising a speed control governor connected to the engine, for controlling the speed of the engine, a switching valve connected to the heat transfer means, a thermostat sensing the temperature of the compartment and a control valve; said control valve being operated by a fluid pressure supply from the engine and having one outlet to said governor and a second outlet to said switching valve, said thermostat being operatively attached to said control valve for causing the displacement of fluid pressure to said governor and to said switching valve.

2. In a heat transfer system controlling the temperatures in a compartment having an engine and a heat transfer means driven by said engine; the combination of a control comprising a speed control governor connected to the engine, for controlling the speed of the engine, a switching control connected to the heat transfer means and for controlling the output thereof, a control valve connected to and operated by a source of fluid pressure from the engine, a thermostat sensing the temperature of the compartment connected to said control valve for actuating same, and fluid pressure outlet connections from said control valve to said governor and to said switching valve whereby the engine speed and compartment temperature are controlled.

3. In combination with a heat transfer means controlling the temperature in a compartment and an engine connected to said means for driving same; a control valve connected to a source of fluid pressure provided by said engine, a thermostat sensing the temperature of the compartment connected to said valve for actuating same, a fluid pressure operated speed governor controlling the engine speed and fluid connected to said valve, and a switching valve fluid operated and connected to said control valve; said switching valve controlling the output of the heat transfer means.

4. In combination with a heat transfer means controlling the temperature in a compartment and an engine connected to said means for driving same; a control valve connected to a source of fluid pressure provided by said engine, a speed governor connected to the throttle of said engine, a switching valve connected to said heat transfer means, and a thermostat sensing the compartment temperature connected to said control valve; said control valve having formed therein a chamber, a pair of valve seats in said chamber, a valve element disposed in said chamber for operation between said valve seats, a valve lifter carrying said element and operable by said thermostat, a fluid pressure connection from said chamber to said governor and a fluid pressure connection from said chamber to said switching valve, movement of said valve element responsive to actuation by said thermostat causing displacement of fluid pressure to said governor and to said switching valve.

5. In combination with a heat transfer means and an engine connected to said means for driving same; a control valve having formed therein a chamber, a fluid pressure connection between said chamber and a source of fluid pressure on said engine, a pair of valve seats in said chamber, a valve lifter extending through the body of said valve into said chamber and a valve element on said lifter between said valve seats; a governor connected to the throttle of said engine and a fluid pressure connection from said governor to one end of said chamber; a switching valve connected to said heat transfer means for controlling heating and cooling phases of same and a fluid pressure connection from said switching valve to said chamber between said valve seats; and a thermostat operable against said valve lifter for actuating said control valve element.

6. In combination with a heat transfer means and an engine connected to said means for driving same; a control valve having a connection to a source of fluid pressure on said engine, a switching valve connected to said heat transfer means for controlling heating and cooling phases of same, a governor connected to the throttle of said engine, a fluid pressure outlet from said control valve for each of said switching valve and said governor, and a thermostat on a controlled compartment including an operative connection for actuating said control valve, said control valve operable for actuating said governor for high engine speed and for actuating said governor for engine idle and switching valve actuation.

7. A control for a heat transfer means according to claim 5 and said source of fluid pressure on said engine supplying said fluid at a pressure proportional to the speed of the engine.

8. A control for a heat transfer means according to claim 7 and said fluid being lube oil from the sump of said engine, said chamber in said control valve having an outlet port to which is fitted a bleed line for the purpose of returning said lube oil to said engine.

References Cited

UNITED STATES PATENTS

| 1,582,462 | 4/1926 | Giesler | 236—35.3 |
| 1,612,445 | 12/1926 | Koehnhorn | 236—82 |
| 2,258,366 | 10/1941 | Otto. | |
| 2,333,729 | 11/1943 | Miller et al. | 62—159 |
| 2,435,493 | 2/1948 | Cary | 236—79 |

ROBERT A. O'LEARY, *Primary Examiner.*

W. E. WAYNER, *Assistant Examiner.*

U.S. Cl. X.R.

62—230; 165—26, 42; 236—82; 92—40, 94; 317—231; 320—38